United States Patent
Yu et al.

(10) Patent No.: US 11,487,174 B2
(45) Date of Patent: Nov. 1, 2022

(54) ARRAY SUBSTRATE AND LIQUID CRYSTAL DISPLAY PANEL

(71) Applicant: SHENZHEN CHINA STAR OPTOELECTRONICS SEMICONDUCTOR DISPLAY TECHNOLOGY CO., LTD., Shenzhen (CN)

(72) Inventors: Zhe Yu, Shenzhen (CN); Bangyin Peng, Shenzhen (CN); Ilgon Kim, Shenzhen (CN)

(*) Notice: Subject to any disclaimer, the term of this patent is extended or adjusted under 35 U.S.C. 154(b) by 199 days.

(21) Appl. No.: 16/772,823

(22) PCT Filed: May 20, 2020

(86) PCT No.: PCT/CN2020/091300
§ 371 (c)(1),
(2) Date: Jun. 15, 2020

(87) PCT Pub. No.: WO2021/227108
PCT Pub. Date: Nov. 18, 2021

(65) Prior Publication Data
US 2022/0128874 A1    Apr. 28, 2022

(30) Foreign Application Priority Data
May 13, 2020 (CN) .......................... 202010401815.6

(51) Int. Cl.
*G02F 1/1362* (2006.01)
(52) U.S. Cl.
CPC .. *G02F 1/136286* (2013.01); *G02F 1/136222* (2021.01)

(58) Field of Classification Search
None
See application file for complete search history.

(56) References Cited

U.S. PATENT DOCUMENTS

| 5,010,774 A | 4/1991 | Kikuo et al. |
| 6,104,465 A * | 8/2000 | Na .......................... G02F 1/1345 349/152 |
| 2008/0266495 A1 | 10/2008 | Lin |

(Continued)

FOREIGN PATENT DOCUMENTS

| CN | 102650776 A | 8/2012 |
| CN | 202887154 U | 4/2013 |
| CN | 106094373 A | 11/2016 |

(Continued)

*Primary Examiner* — Richard H Kim

(57) ABSTRACT

An array substrate includes a substrate, a first metal layer disposed on the substrate, an insulating layer disposed on the first metal layer, and a second metal layer disposed on the insulating layer. The substrate includes a low-voltage area. One of the first metal layer and the second metal layer includes a plurality of low-voltage signal lines in the low-voltage area. The other one of the first metal layer and the second metal layer includes one or more third auxiliary traces in the low-voltage area. The insulating layer is provided with a plurality of pairs of conductive metalized holes. Each pair of the conductive metalized holes includes two conductive metalized holes electrically connecting two ends of a corresponding third auxiliary trace and two ends of a corresponding low-voltage signal line.

5 Claims, 3 Drawing Sheets

(56) References Cited

U.S. PATENT DOCUMENTS

2012/0218237 A1   8/2012   Shimada et al.

FOREIGN PATENT DOCUMENTS

| CN | 106933416 A | 7/2017 |
| CN | 109933234 A | 6/2019 |
| CN | 110989857 A | 4/2020 |
| CN | 111258132 A | 6/2020 |
| WO | 9314386 A1 | 7/1993 |

* cited by examiner

ARRAY SUBSTRATE AND LIQUID CRYSTAL DISPLAY PANEL

FIELD OF INVENTION

The present disclosure relates to the technical field of display, and particularly to an array substrate and a liquid crystal display panel.

BACKGROUND

In 8K thin film transistor liquid crystal display (TFT-LCD) panels, due to their large size and many long signal lines, the signal lines are overloaded. In cases of lead-on-chip (LOC), resistance in a low-voltage area is too large, which causes serious resistance-capacitance (RC) delays in a display plane, affecting display quality of the display panel.

Therefore, there is an urgent need to improve defects in the prior art.

SUMMARY OF DISCLOSURE

The purpose of the present application is to provide an array substrate and a liquid crystal display panel, which have beneficial effects of reducing resistance of a low-voltage area and thus reducing resistance-capacitance (RC) delay.

The present disclosure provides an array substrate comprising:

a substrate comprising a low-voltage area on its upper surface;

a first metal layer disposed on the substrate and comprising one or more third auxiliary traces in the low-voltage area, wherein the third auxiliary traces comprise a plurality of fourth auxiliary traces;

an insulating layer disposed on the first metal layer and provided with a plurality of pairs of conductive metalized holes, wherein each pair of the conductive metalized holes comprises two conductive metalized holes; and a second metal layer disposed on the insulating layer and comprising a plurality of low-voltage signal lines in the low-voltage area, wherein the low-voltage signal lines comprise a plurality of second low-voltage signal lines;

wherein the two conductive metalized holes of each pair of the conductive metalized holes electrically connect two ends of a corresponding third auxiliary trace and two ends of a corresponding low-voltage signal line, and some or all of the second low-voltage signal lines are connected to the fourth auxiliary traces one-to-one through the pairs of the conductive metalized holes, so that a parallel equivalent resistance of the second low-voltage signal lines and corresponding fourth auxiliary traces is a fixed value.

In an embodiment, a number of the low-voltage signal lines is greater than a number of the third auxiliary traces. Some of the low-voltage signal lines correspond to the third auxiliary traces one-to-one. Each third auxiliary trace is connected in parallel with a corresponding low-voltage signal line through a corresponding pair of the conductive metalized holes.

In an embodiment, a number of the low-voltage signal lines is equal to a number of the third auxiliary traces. The low-voltage signal lines correspond to the third auxiliary traces one-to-one. Each third auxiliary trace is connected in parallel with a corresponding low-voltage signal line through a corresponding pair of the conductive metalized holes.

In an embodiment, some or all of the fourth auxiliary traces have different widths or lengths.

The present disclosure further provides an array substrate comprising:

a substrate comprising a low-voltage area on its upper surface;

a first metal layer disposed on the substrate;

an insulating layer disposed on the first metal layer and provided with a plurality of pairs of conductive metalized holes, wherein each pair of the conductive metalized holes comprises two conductive metalized holes; and a second metal layer disposed on the insulating layer;

wherein one of the first metal layer and the second metal layer comprises a plurality of low-voltage signal lines in the low-voltage area, the other one of the first metal layer and the second metal layer comprises one or more third auxiliary traces in the low-voltage area, and the two conductive metalized holes of each pair of the conductive metalized holes electrically connect two ends of a corresponding third auxiliary trace and two ends of a corresponding low-voltage signal line.

In an embodiment, a number of the low-voltage signal lines is greater than a number of the third auxiliary traces. Some of the low-voltage signal lines correspond to the third auxiliary traces one-to-one. Each third auxiliary trace is connected in parallel with a corresponding low-voltage signal line through a corresponding pair of the conductive metalized holes.

In an embodiment, a number of the low-voltage signal lines is equal to a number of the third auxiliary traces. The low-voltage signal lines correspond to the third auxiliary traces one-to-one. Each third auxiliary trace is connected in parallel with a corresponding low-voltage signal line through a corresponding pair of the conductive metalized holes.

In an embodiment, the first metal layer comprises the third auxiliary traces, and the second metal layer comprises the low-voltage signal lines.

In an embodiment, the second metal layer comprises the third auxiliary traces, and the first metal layer comprises the low-voltage signal lines.

In an embodiment, the low-voltage signal lines comprise a plurality of second low-voltage signal lines. The third auxiliary traces comprise a plurality of fourth auxiliary traces. Some or all of the second low-voltage signal lines are connected to the fourth auxiliary traces one-to-one through the pairs of the conductive metalized holes so that a parallel equivalent resistance of the second low-voltage signal lines and corresponding fourth auxiliary traces is a fixed value.

In an embodiment, some or all of the fourth auxiliary traces have different widths or lengths.

The present disclosure further provides a liquid crystal display panel comprising a color filter substrate, an array substrate, and a liquid crystal layer disposed between the color filter substrate and the array substrate. The array substrate comprises:

a substrate comprising a low-voltage area on its upper surface;

a first metal layer disposed on the substrate;

an insulating layer disposed on the first metal layer and provided with a plurality of pairs of conductive metalized holes, wherein each pair of the conductive metalized holes comprises two conductive metalized holes; and a second metal layer disposed on the insulating layer;

wherein one of the first metal layer and the second metal layer comprises a plurality of low-voltage signal lines in the low-voltage area, the other one of the first metal layer and the second metal layer comprises one or more third auxiliary traces in the low-voltage area, and the two conductive metalized holes of each pair of the conductive metalized holes electrically connect two ends of a corresponding third auxiliary trace and two ends of a corresponding low-voltage signal line.

In an embodiment, the liquid crystal display panel further comprises one or more pairs of connecting metal members. The first metal layer comprises the third auxiliary traces. The second metal layer comprises the low-voltage signal lines. The color filter substrate is provided with one or more first auxiliary traces on its lower surface. Each pair of the connecting metal members comprises two connecting metal members, which are disposed between the color filter substrate and the array substrate to electrically connect two ends of a corresponding low-voltage signal line and two ends of a corresponding first auxiliary trace.

In an embodiment, a number of the first auxiliary traces is more than one. The pairs of the connecting metal members and the first auxiliary traces have a same number and correspond to each other one-to-one. The two connecting metal members of each pair of the connecting metal members electrically connect two ends of a corresponding first auxiliary trace and two ends of a corresponding low-voltage signal line, so that each of the first auxiliary traces is connected in parallel with a corresponding low-voltage signal line.

In an embodiment, each of the first auxiliary traces and the corresponding low-voltage signal line are directly opposite to each other and have same shape and size.

In an embodiment, a portion of each of the first auxiliary traces and a portion of the corresponding low-voltage signal line are opposite to each other and have same shape.

In an embodiment, some of the low-voltage signal lines are electrically connected to the first auxiliary traces one-to-one through the pairs of the connecting metal members.

In the present invention, a low-voltage signal line is connected in parallel with an auxiliary trace at both ends to reduce its resistance, thereby achieving a purpose of reducing resistance of a low-voltage area and a beneficial effect of reducing RC delay.

BRIEF DESCRIPTION OF DRAWINGS

In order to more clearly illustrate the technical solutions in the embodiments of the present disclosure, a brief description of accompanying drawings used in the description of the embodiments of the present disclosure will be given below. Obviously, the accompanying drawings in the following description are merely some embodiments of the present disclosure. For those skilled in the art, other drawings may be obtained from these accompanying drawings without creative labor.

DETAILED DESCRIPTION

Figure 1:
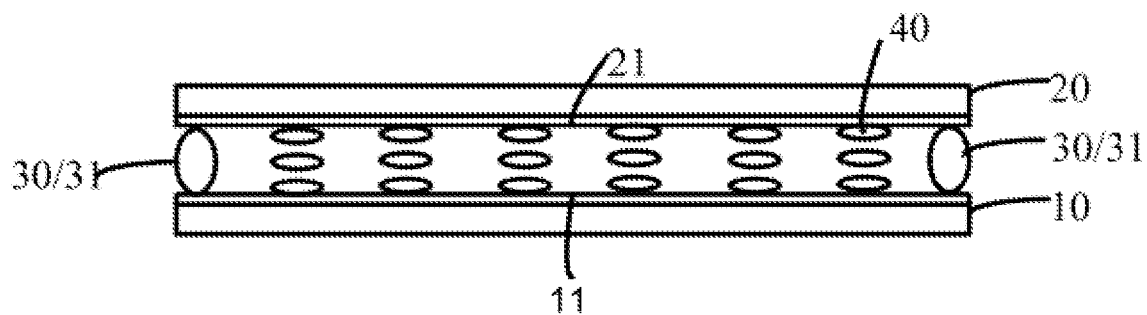
FIG. 1 is a schematic diagram of a first structure of a liquid crystal display panel according to an embodiment of the present disclosure.

Technical solutions in embodiments of the present disclosure will be clearly and completely described below in conjunction with accompanying drawings in the embodiments of the present disclosure. Apparently, the described embodiments are merely some of the embodiments of the present disclosure and not all embodiments. Generally, components of the embodiments of the present disclosure that are illustrated in the accompanying drawings may be arranged and designed in various configurations. Therefore, the following detailed description of the embodiments of the present disclosure that are illustrated in the accompanying drawings is not intended to limit the claimed scope of the present invention, but merely represents selected embodiments of the present disclosure. All other embodiments obtained by those skilled in the art based on the embodiments of the present disclosure without creative labor are within the claimed scope of the present invention.

It should be noted that same reference numerals and letters in the accompanying drawings indicate same elements. Therefore, once an element is defined in an accompanying drawing, it does not need to be further defined and explained in subsequent accompanying drawings. Furthermore, in the description, terms "first" and "second" are only used for distinction and description, and cannot be understood as indicating or implying relative importance.

Figure 2:
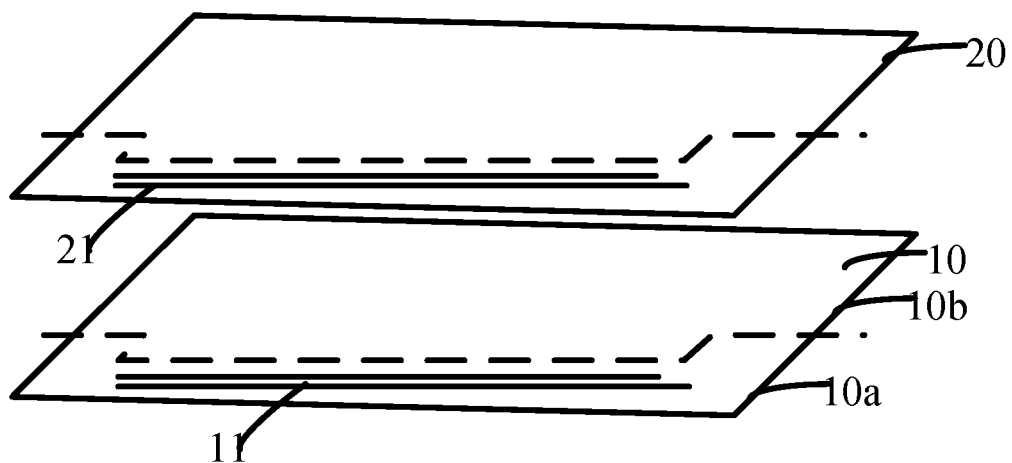
FIG. 2 is a schematic diagram of an array substrate and a color filter substrate of the liquid crystal display panel of FIG. 1.

Please refer to FIG. 1 and FIG. 2. A liquid crystal display panel comprises an array substrate 10, a color filter substrate 20, a liquid crystal layer 40, and one or more pairs of connecting metal members 30. The liquid crystal layer 40 and the pairs of the connecting metal members 30 are disposed between the array substrate 10 and the color filter substrate 20.

The array substrate 10 comprising a low-voltage area 10a and a high-voltage area 10b on its upper surface. The high-voltage area 10b is provided with a plurality of high-voltage signal lines. The low-voltage area 10a is provided with a plurality of low-voltage signal lines 11. The color filter substrate 20 is provided with one or more first auxiliary traces 21 on its lower surface. Each pair of the connecting metal members 30 comprises two connecting metal members 31, which are disposed between the color filter substrate 20 and the array substrate 10 to electrically connect two ends of a corresponding low-voltage signal line 11 and two ends of a corresponding first auxiliary trace 21, thereby reducing resistance of the low-voltage signal line 11 and reducing resistance-capacitance (RC) delay.

The connecting metal members 31 are connecting metal balls.

The low-voltage area 10a is located in a non-display area of the array substrate 10. The array substrate 10 is also provided with a thin film transistor (TFT) array driving structure, which is known to those skilled in the art and therefore need not be described in detail.

The color filter substrate 20 is also provided with optical functional layers, which is known to those skilled in the art and therefore need not be described in detail.

The liquid crystal molecule layer 40 may be composed of currently commonly used liquid crystal molecules, which is known to those skilled in the art and therefore need not be described in detail.

Specifically, the first auxiliary traces 21 may be made of indium tin oxide (ITO). An ITO layer formed on the lower surface of the color filter substrate 20 may be formed into the first auxiliary trace 21 distributed corresponding to the low-voltage signal lines 11 on the array substrate 10 by a photomask process.

In an embodiment, a number of the first auxiliary traces 21 is more than one. The pairs of the connecting metal members 30 and the first auxiliary traces 21 have a same number and correspond to each other one-to-one. The two connecting metal members 31 of each pair of the connecting metal members 30 electrically connect two ends of a corresponding first auxiliary trace 21 and two ends of a corresponding low-voltage signal line 11, so that each of the first auxiliary traces is connected in parallel with a corresponding low-voltage signal line.

Understandably, in some embodiments, the number of the first auxiliary traces 21 is more than one, and some of the low-voltage signal lines 11 are electrically connected to the first auxiliary traces 21 one-to-one through the pairs of the connecting metal members 30. That is, each of the low-voltage signal lines 11 is connected in parallel with a corresponding first auxiliary trace 21, and different low-voltage signal lines 11 are connected in parallel with different first auxiliary traces 21.

Understandably, in some embodiments, the number of the first auxiliary traces 21 is more than one, and some of the low-voltage signal lines 11 are electrically connected to the first auxiliary traces 21 one-to-one through the pairs of the connecting metal members 30. That is, a part of the low-voltage signal lines 11 is connected in parallel with the first auxiliary traces 21, and the other part of the low-voltage signal lines 11 is not connected in parallel with the first auxiliary traces 21.

In order to facilitate layout and connection of the first auxiliary traces 21, each of the first auxiliary traces 21 and a corresponding low-voltage signal line 11 are directly opposite to each other and have a same shape and size. Alternatively, in some embodiments, a portion of each of the first auxiliary traces 21 and a portion of the corresponding low-voltage signal line 11 are opposite to each other and have a same shape.

In some embodiments, the low-voltage signal lines 11 comprise a plurality of first low-voltage signal lines. The first auxiliary traces 21 comprise a plurality of second auxiliary traces. For example, the first low-voltage signal lines are all cathode traces or low-voltage level clock signal traces. Some or all of the first low-voltage signal lines are connected to the second auxiliary traces one-to-one through the pairs of the connecting metal members 30 so that a parallel equivalent resistance of the first low-voltage signal lines and corresponding second auxiliary traces is a fixed value. That is, in order to achieve a purpose that the first low-voltage signal lines have same equivalent resistance, each of the first low-voltage signal lines may or may not be selected to be connected in parallel with the second auxiliary traces. Resistance of each of the second auxiliary traces connected in parallel is set according to the fixed value. For example, some or all of the second auxiliary traces have different widths or lengths.

Figure 3:
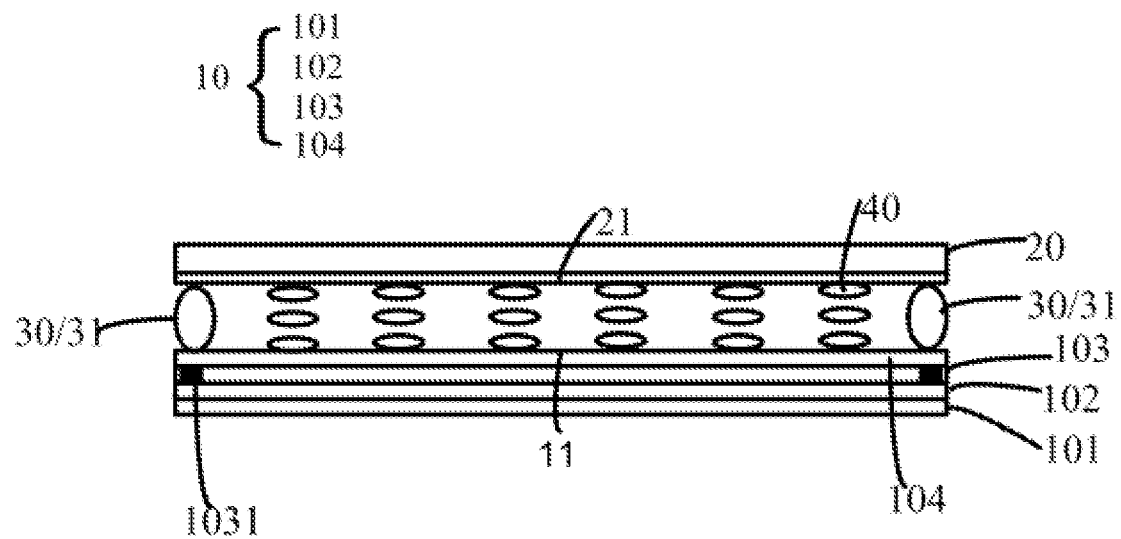
FIG. 3 is a schematic diagram of a second structure of a liquid crystal display panel according to an embodiment of the present disclosure.
Figure 4:
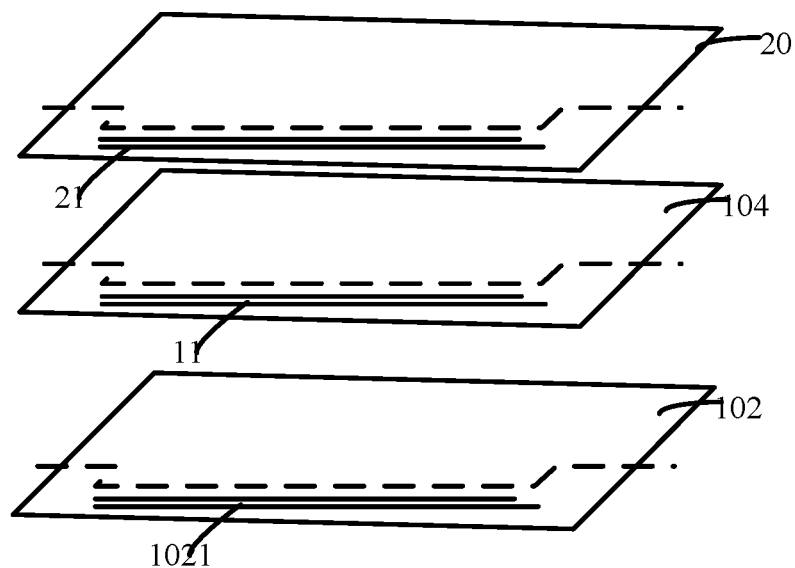
FIG. 4 is a schematic diagram of a first metal layer, a second metal layer, and a color filter substrate of the liquid crystal display panel of FIG. 3.

Please refer to FIG. 3 and FIG. 4. An array substrate 10 comprises a substrate 101, a first metal layer 102, an insulating layer 103, and a second metal layer 104. The first metal layer 102 is disposed on the substrate 101. The insulating layer 103 is disposed on the first metal layer 102. The second metal layer 104 is disposed on the insulating layer 103.

The second metal layer 104 comprises a plurality of low-voltage signal lines 11 in a low-voltage area. The first metal layer 102 comprises one or more third auxiliary traces 1021 in the low-voltage area. The insulating layer 103 is provided with one or more pairs of conductive metalized holes. Each pair of the conductive metalized holes comprises two conductive metalized holes 1031. The two conductive metalized holes 1031 of each pair of the conductive metalized holes electrically connect two ends of a corresponding third auxiliary trace 1021 and two ends of a corresponding low-voltage signal line 11.

In some embodiment, a number of the third auxiliary traces 1021 is more than one. One or more pairs of connecting metal members 30 and the third auxiliary traces 1021 have a same number and correspond to each other one-to-one.

A number of the low-voltage signal lines 11 is greater than the number of the third auxiliary traces 1021. Some of the low-voltage signal lines 11 correspond to the third auxiliary traces 1021 one-to-one. Each third auxiliary trace 1021 is connected in parallel with a corresponding low-voltage signal line 11 through a corresponding pair of the conductive metalized holes. Alternately, the number of the low-voltage signal lines 11 is equal to the number of the third auxiliary traces 1021. The low-voltage signal lines 11 correspond to the third auxiliary traces 1021 one-to-one. Each third auxiliary trace 1021 is connected in parallel with a corresponding low-voltage signal line 11 through a corresponding pair of the conductive metalized holes.

The two conductive metalized holes 1031 of each pair of the conductive metalized holes electrically connect two ends of a corresponding third auxiliary trace 1021 and two ends of a corresponding low-voltage signal line 11 so that each third auxiliary trace 1021 is connected in parallel with a corresponding low-voltage signal line 11. Understandably, in some embodiments, equivalent resistance of one low-voltage signal line 11 and the third auxiliary trace 1021 connected in parallel therewith is equal to equivalent resistance of another low-voltage signal line 11 and the first auxiliary trace 21 connected in parallel therewith. Therefore, in order to achieve same equivalent resistance, resistances of the third auxiliary traces 1021 and resistances of first auxiliary traces need to be designed according to resistances of the low-voltage signal lines 11.

Understandably, in some embodiments, the number of the third auxiliary traces 1021 is less than the number of the low-voltage signal lines 11. That is, only some of the low-voltage signal lines 11 are connected in parallel with the third auxiliary traces 1021. In some embodiments, the low-voltage signal lines 11 comprise a plurality of second low-voltage signal lines. The third auxiliary traces 1021 comprise a plurality of fourth auxiliary traces. Some or all of the second low-voltage signal lines are connected to the fourth auxiliary traces one-to-one through the pairs of the conductive metalized holes so that a parallel equivalent resistance of the second low-voltage signal lines and corresponding fourth auxiliary traces is a fixed value. That is, in order to achieve a purpose that the second low-voltage signal lines have same equivalent resistance, each of the second low-voltage signal lines may be selected to be connected in parallel with the fourth auxiliary traces or not. Resistance of each of the fourth auxiliary traces connected in parallel is set according to the fixed value. For example, some or all of the fourth auxiliary traces have different widths or lengths.

Understandably, in some embodiments, a part of the low-voltage signal lines 11 corresponds to the first auxiliary traces 21 disposed on a lower surface of a color filter substrate 20 one-to-one, and the other part of the low-voltage signal lines 11 corresponds to the third auxiliary traces 1021 of the first metal layer 102 one-to-one. Therefore, each of the low-voltage signal lines 11 is connected in parallel with an auxiliary trace.

Preferably, in some embodiments, the low-voltage signal lines 11 corresponding to the first auxiliary traces 21 disposed on the color filter substrate 20 and the low-voltage signal lines 11 corresponding to the third auxiliary traces 1021 of the first metal layer 102 are sequentially spaced apart, thereby increasing an interval between the first auxiliary traces 21 on the lower surface of the color filter substrate 20 and increasing an interval between the third auxiliary traces 1021 of the first metal layer 102 of the array substrate 10. Therefore, beneficial effect of reducing interference can be achieved.

Figure 5:
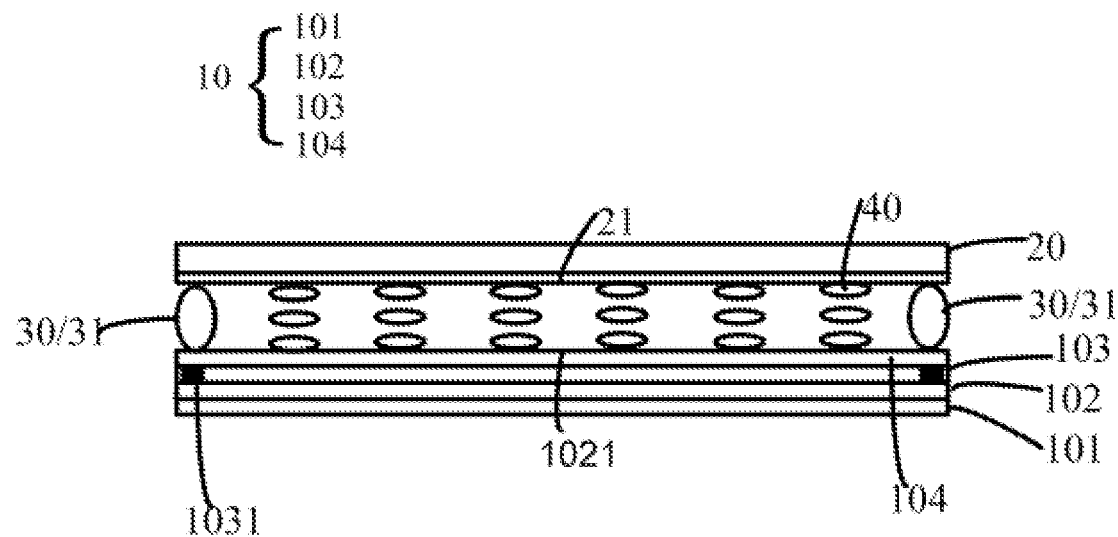
FIG. 5 is a schematic diagram of a third structure of a liquid crystal display panel according to an embodiment of the present disclosure.
Figure 6:
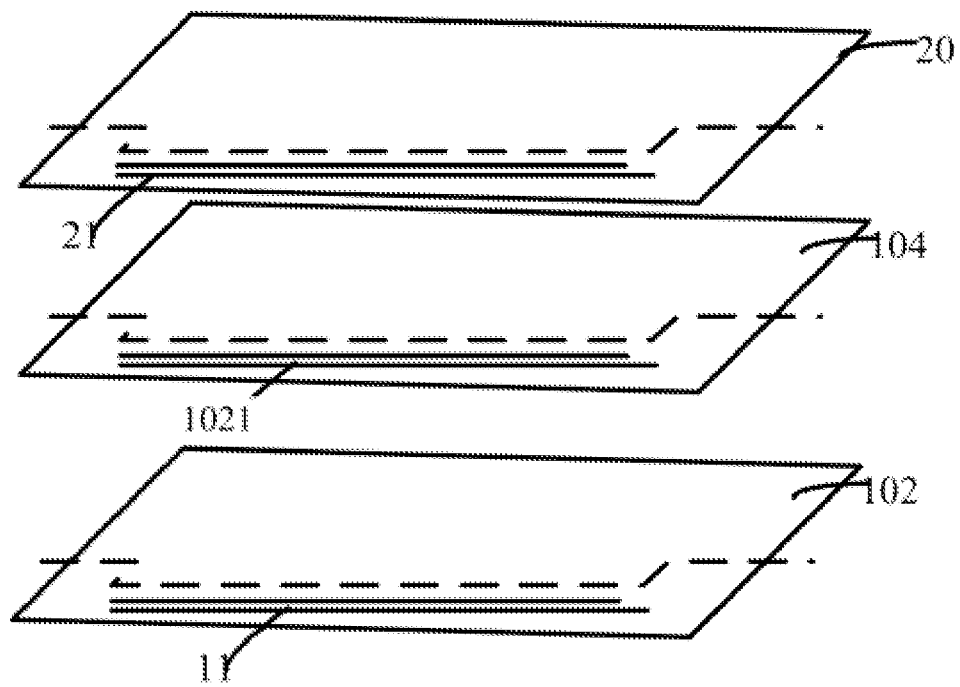
FIG. 6 is a schematic diagram of a first metal layer, a second metal layer, and a color filter substrate of the liquid crystal display panel of FIG. 5.

Please refer to FIG. 5 and FIG. 6. In some embodiments, in an array substrate 10 of a liquid crystal display panel, a first metal layer 102 comprises a plurality of low-voltage signal lines 11, and a second metal layer 104 comprises a plurality of third auxiliary traces 1021.

In this embodiment, a lower surface of a color filter substrate 20 of the liquid crystal display panel may be provided with a first auxiliary trace 21 or not.

When the first auxiliary trace 21 is provided, the first auxiliary trace 21 is connected in parallel with a corresponding third auxiliary trace 1021 through a pair of connecting metal members 30, and then connected in parallel with a corresponding low-voltage signal line 11 through a pair of conductive metalized holes.

In the present invention, a low-voltage signal line is connected in parallel with an auxiliary trace at both ends to reduce its resistance, thereby achieving a purpose of reducing resistance of a low-voltage area and a beneficial effect of reducing RC delay.

In the above description, relational terms such as first and second are used solely to distinguish one from another entity or operation without necessarily requiring or implying any actual such relationship or order between such entities or operations.

The above are only embodiments of the present invention and are not intended to limit the claimed scope of the present invention. Those skilled in the art can make various modifications and changes to the present invention. Any modification, equivalent replacement, improvement, etc. made within principles of the present invention shall fall within the claimed scope of the present invention.

What is claimed is:
1. A liquid crystal display panel, comprising a color filter substrate, an array substrate, a liquid crystal layer disposed between the color filter substrate and the array substrate, and one or more pairs of connecting metal members, wherein the color filter substrate is provided with one or more first auxiliary traces on its lower surface, and the array substrate comprises:
   a substrate comprising a low-voltage area on its upper surface;
   a first metal layer disposed on the substrate and comprising one or more third auxiliary traces in the low-voltage area;
   an insulating layer disposed on the first metal layer and provided with a plurality of pairs of conductive metalized holes, wherein each pair of the conductive metalized holes comprises two conductive metalized holes; and
   a second metal layer disposed on the insulating layer and comprising a plurality of low-voltage signal lines in the low-voltage area,
   wherein the two conductive metalized holes of each pair of the conductive metalized holes electrically connect two ends of a corresponding third auxiliary trace and two ends of a corresponding low-voltage signal line;
   wherein each pair of the connecting metal members comprises two connecting metal members, which are disposed between the color filter substrate and the array substrate to electrically connect two ends of a corresponding low-voltage signal line and two ends of a corresponding first auxiliary trace.

2. The liquid crystal display panel according to claim 1, wherein:
   a number of the first auxiliary traces is more than one;
   the pairs of the connecting metal members and the first auxiliary traces have a same number and correspond to each other one-to-one; and
   the two connecting metal members of each pair of the connecting metal members electrically connect two ends of a corresponding first auxiliary trace and two ends of a corresponding low-voltage signal line, so that each of the first auxiliary traces is connected in parallel with a corresponding low-voltage signal line.

3. The liquid crystal display panel according to claim 2, wherein each of the first auxiliary traces and the corresponding low-voltage signal line are directly opposite to each other and have a same shape and size.

4. The liquid crystal display panel according to claim 2, wherein a portion of each of the first auxiliary traces and a portion of the corresponding low-voltage signal line are opposite to each other and have a same shape.

5. The liquid crystal display panel according to claim 2, wherein some of the low-voltage signal lines are electrically connected to the first auxiliary traces one-to-one through the pairs of the connecting metal members.

* * * * *